Nov. 1, 1949 LA VERN A. CAMPBELL 2,486,734
VEHICLE CAB STRUCTURE
Filed Feb. 13, 1948 3 Sheets-Sheet 1
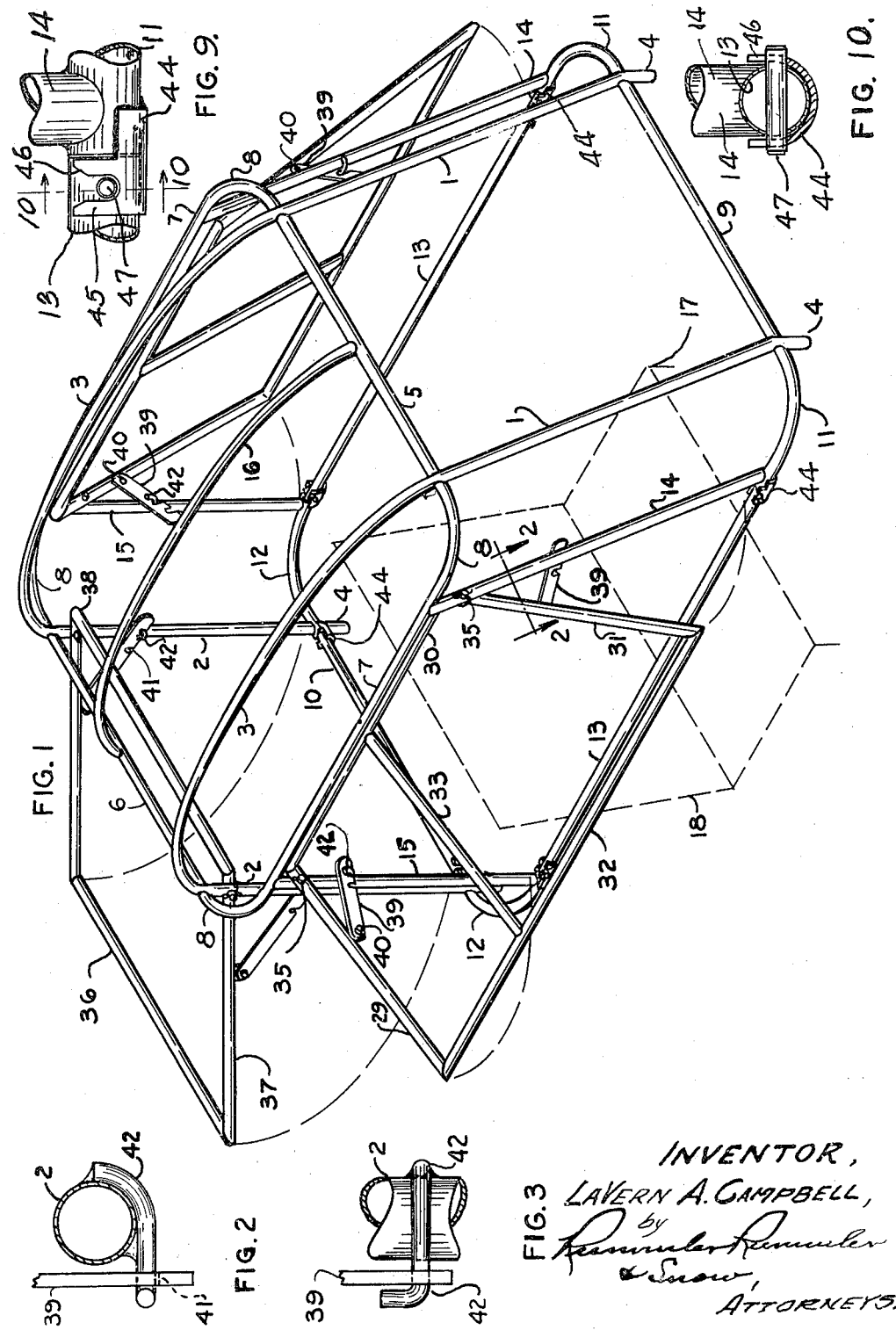
INVENTOR,
LAVERN A. CAMPBELL,
by
Remmeler Remmeler & Snow
ATTORNEYS.

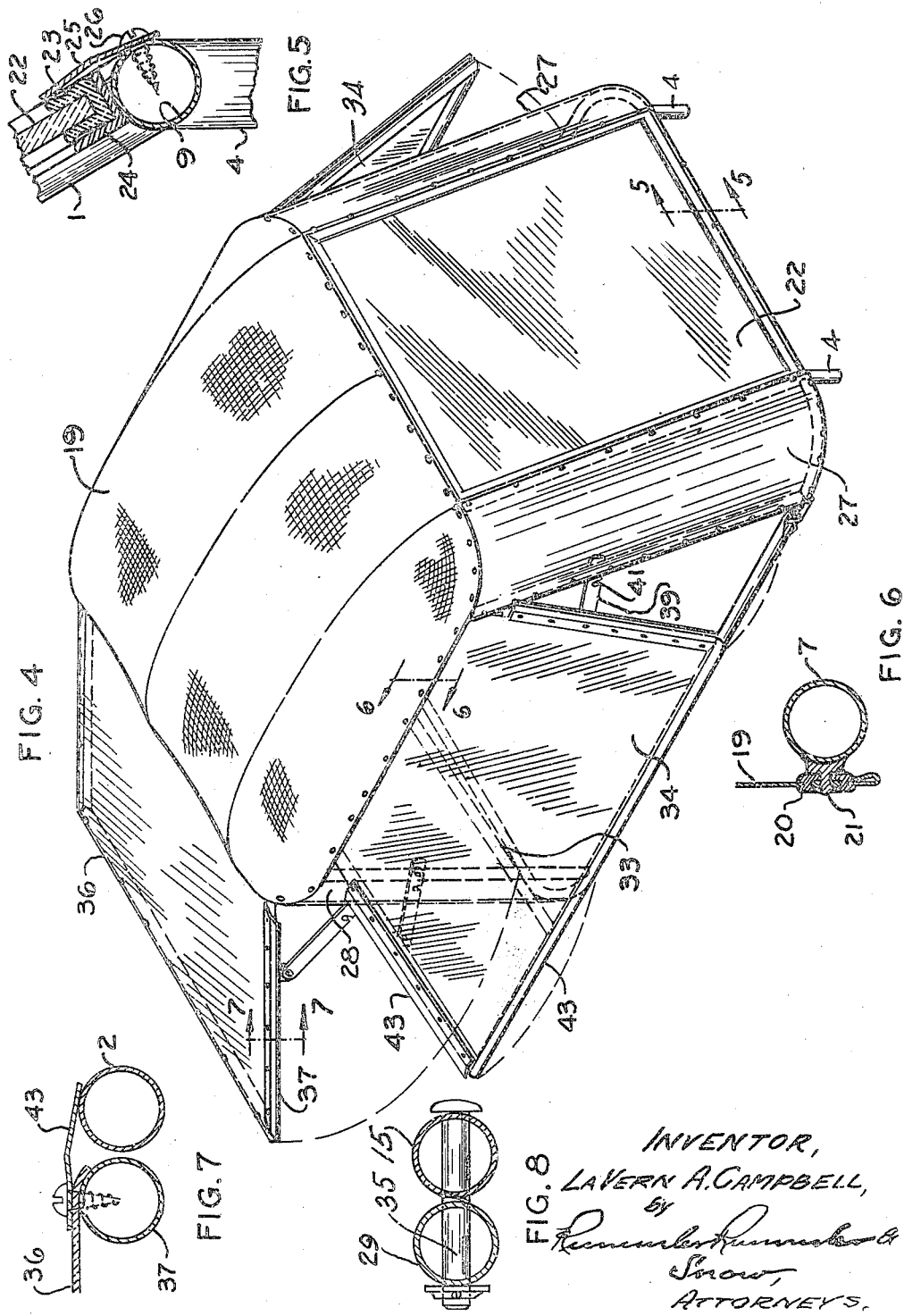

INVENTOR,
LA VERN A. CAMPBELL,
ATTORNEYS

Patented Nov. 1, 1949

2,486,734

UNITED STATES PATENT OFFICE 2,486,734

VEHICLE CAB STRUCTURE

La Vern A. Campbell, Grayslake, Ill.

Application February 13, 1948, Serial No. 8,190

5 Claims. (Cl. 296—102)

This invention relates to vehicle cab structures and particularly to a type of structure that is suitable for use on tractors and other work-performing vehicles with respect to which it is important that the cab structure be quickly removable and readily adjustable for varying needs as regards visibility of environment and the degree of protection that is required for comfort of the operator of the tractor.

The present invention is in the nature of a specific improvement upon and the carrying forward of the invention described and claimed in my copending application Serial No. 756,418, filed June 23, 1947, now Patent 2,479,036, dated August 16, 1949.

The main objects of this invention are to provide certain improvements in the vehicle cab structure whereby the angular ranges of vision from the operator's position within the cab to the environment of the vehicle is greatly enhanced and whereby the adjustments for ventilation and for removability of parts of the cab wall structure are greatly simplified.

A further object is to provide improvements in the cab frame structure which permit of the use of larger windowpane structures than are available in cabs equipped with merely the usual flexible side curtains.

A specific embodiment of this invention is shown in the accompanying drawings in which:

Figure 1 is a perspective view of the skeleton framework of the improved cab structure.

Fig. 2 is a detail of a side latch brace for a hinged side window as viewed from the line 2—2 of Fig. 1.

Fig. 3 is a fragmentary elevation of the same.

Fig. 4 is a perspective view of the main body portion of the cab structure, with its roofing and wall surface members in place on the skeleton frame and with the hinged side and rear wall panels in a partly open position.

Fig. 5 is a sectional detail taken on the line 5—5 of Fig. 4.

Fig. 6 is a sectional detail taken on the line 6—6 of Fig. 4.

Fig. 7 is a sectional detail taken on the line 7—7 of Fig. 4.

Fig. 8 is a detail of the hinge joint for the swinging side panels, the frame bars being shown in section.

Fig. 9 is a fragmentary detail of the hanger for the removable bottom bars of the skeleton frame.

Fig. 10 is a sectional detail of the same taken on line 10—10 of Fig. 9.

Figure 11:
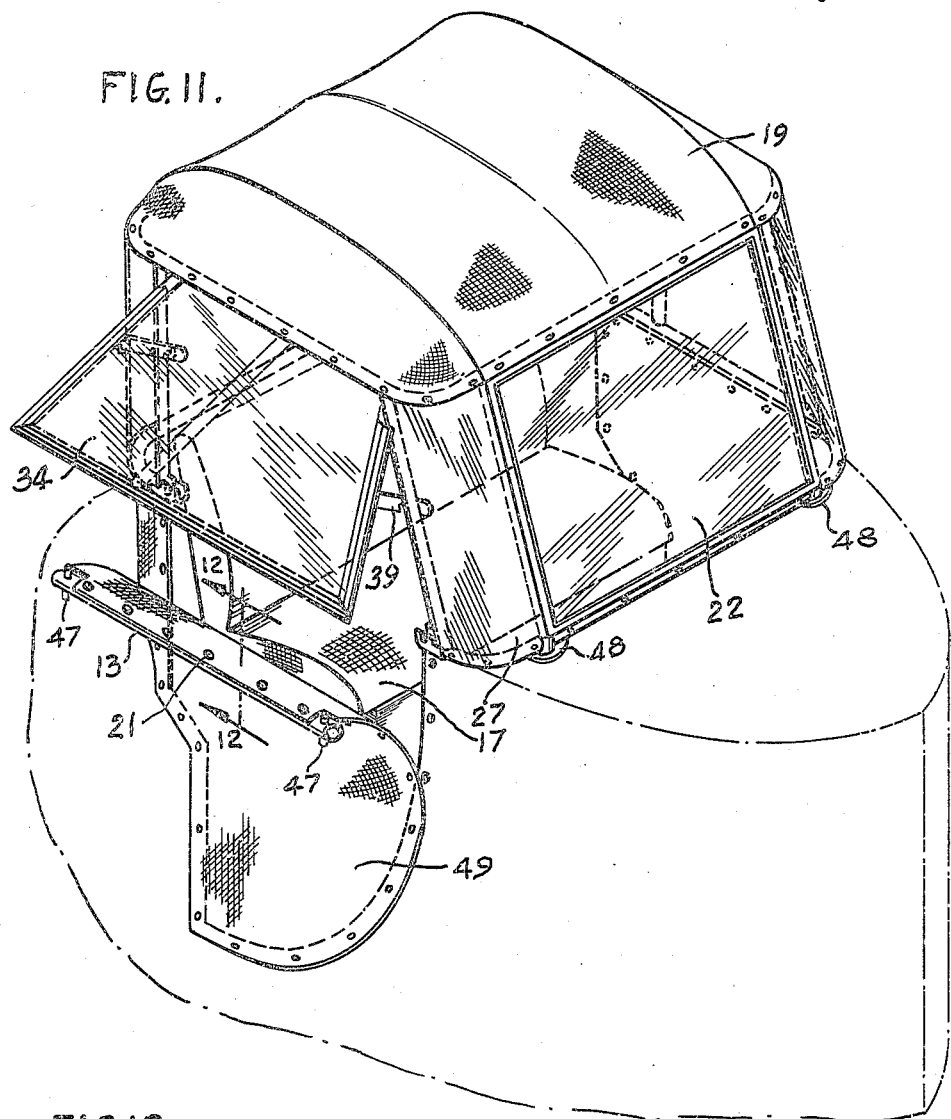

Fig. 11 is a perspective view corresponding to Fig. 4 and illustrating the manner in which removable aprons are hung upon the bottom bars of the main frame in places where it is desirable to close spaces between the bottom of the cab frame and adjacent portions of the fixed structure of the tractor; thus rendering the cab structure readily adaptable to existing types of tractors. In this view the dash-dotted lines are representative of portions of the tractor structure upon which the cab is mounted. One of the depending aprons is indicated in full lines with the removable bottom bar displaced from its normal position for clearness of illustration of the structure involved.

Figure 12:
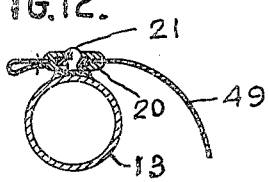

Fig. 12 is a sectional detail taken on a line parallel with the line 12—12 to illustrate the mode of attachment of the curtain to the removable frame bar.

In the form shown in the drawings, the skeleton frame is made up mainly of tubular bars for strength and lightness and includes a pair of arched main frame girder members laterally spaced apart and bent to form front posts 1 and rear posts 2 integrally continuous with roof bars 3. The rear posts 2 are preferably vertical, while the front posts 1 are slanted forward and downward but their lower ends are vertical and form stanchions 4 which have vertical telescopic engagement with socket members on the vehicle structure or on saddles or other structures whereby the cab is adapted to fit any particular form of tractor, as will be understood by those skilled in the art.

These posts 1 and 2 are connected together by a top frame comprising a straight front bar 5, a straight rear bar 6 and a pair of side bars 7 which are bowed outwardly to define bay structures at the sides of the cab. The bars 7 are straight throughout the main part of their length and their curvature is confined to their end portions 8. The bars 5, 6 and 7 are fitted and welded to the posts 1 and 2 so as to be virtually continuous with each other.

The bottom frame is similar in form to the top frame in that it comprises a front bar 9 connecting the posts 1 and a rear bar 10 connecting the posts 2 at the front and rear respectively of the cab and curved bottom frame portions 11 and 12, but the intermediate portions as side bars 13 are mounted so as to be readily removable. The free ends of the fixed bars 11 are connected by posts 14 with the forward ends of the straight portions 7 of the top frame and the free ends of the bars 12 are connected by posts 15 with the rearward ends of the straight portions of the bars 7. Thus the posts 1, 14, 15 and 2 with the corresponding portions of the top and bottom frames define the bays at the sides of the cab frame.

The main skeleton frame also comprises one or more roof stringers 16 which correspond in shape to the bowed top bars 3 and support the roof of the cab.

The frame is, of course, designed to give support for the housing members arranged about the position occupied by the operator above the chassis of the vehicle and this relationship is indicated in a general way in Fig. 1 of the drawings by the outlines of a seat 17 and seat back 18.

The roof portion of the cab, in the form shown, is covered with water-proofed canvas or other suitable roof sheeting material 19 which has its edges appropriately fastened to the top frame bars 5, 6, 7 and 8, as by snap eyelets 20. As shown in Fig. 6 the eyelets 20 cooperate with studs 21, welded or otherwise mounted on the frame bars 7.

The front panel defined by the posts 1 and frame bars 5 and 9 is fully occupied by the windshield 22 which may be a single plate of shatterproof glass mounted in a packing 23 supported by an angle frame 24 that is welded to the cab frame bars in the manner indicated in Fig. 5. The packing 23 may be of rubber or lead for air tight engagement with the frame bars 24 and may be fastened in place by strips 25 of resilient material fastened by screws 26.

The front and rear wing panels 27 and 28 of the side bays are preferably covered with a flexible transparent sheeting of plastic or the like to provide windows at the sides of the windshield.

The main side panel of each bay in the skeleton frame, as defined by the frame bars 15, 7, 14 and 13, has mounted therein a window sash frame comprising bars 29, 30, 31 and 32 having one or more intermediate bars 33 for supporting a transparent windowpane 34 which for lightness of weight may be of flexible transparent material such as airplane glass, plastic sheeting, or the like.

This side panel frame is hinged adjacent its upper end so that its bottom edge may be swung outward, as indicated in Figures 1 and 4. This hinging may be accomplished by trunnion bolts 35 passing through the bars 29 or 31 of the sash frame and the posts 15 or 14 respectively of the bay frame. These bolts are arranged to be readily removable, as indicated in detail in Fig. 8.

The rear wall panel of the skeleton frame, as defined by posts 2 and horizontal bars 6 and 10, has similarly mounted therein a window 36 having a transparent pane and rigid sash frame 37 corresponding to those of the side panel windows and is similarly mounted on hinged trunnions 38 adjacent its upper edge so that it may be swung outward from the bottom.

The positions of the three swinging windows are controlled by latch links 39 pivoted at 40 on opposite sides of the sash, each link having one or more notches 41 coacting with a stud 42 on the stationary frame bar to secure the window in different positions. Details of this latching arrangement are shown on a larger scale in Figs. 2 and 3.

The swinging window panels are equipped with resilient weather stripping 43, as indicated in detail in Fig. 7, for closing the gaps between the sash bars and the fixed bars which define the corresponding panels in the skeleton frame. These swinging panels are of the full height of the walls of the cab, so as to form doors which permit the operator to enter or leave the cab at either side or the rear thereof.

The side bottom bars 13 and the rear bottom bar 10 are preferably removable in order to give freedom of access to the interior of the cab under certain circumstances. In the form shown, the portions of the bottom frame to which these removable bars are connected are provided with seat fixtures or brackets 44 shown in detail in Figs. 9 and 10. These brackets are conveniently made of a U-shaped piece of metal with its bottom portion conforming to the curvature of the bottom bar. The bracket plates are welded to a fixed portion of the bottom bar and extend outward therefrom a sufficient distance to provide an adequate seat for the end of the removable bar 13. This extended seat portion 45, as detailed in Figs. 9 and 10, has notches 46 in its opposite side arms to receive a pin 47 that extends through the bar 13 and projects at opposite sides sufficiently to engage the notches 46, thus tying the lower end of the adjacent frame posts together.

In the skeleton structure of the cab, it is preferred that the uprights 1 and 2 and the connecting roof stringer 3 be made of a single bar bent to an appropriate U-shape and that the uprights 1 and 2 be extended below the bottom frame of the cab to provide four vertical stanchions by means of which the cab is attached to the vehicle by being seated in socket members 48, such as are indicated in Fig. 11. The socket members are attached to suitably located parts of the vehicle structure, if there be such, or are formed in special saddles that are attached to the vehicle structure as described in my said copending application, Serial No. 756,418.

As will be seen from Figs. 1 and 11, the cab structure is so proportioned as to surround the occupied space with the bottom bars of the cab frame located somewhat above the operator's seat 17. Any open spaces between the bottom bars of the cab frame and the permanent structure of the vehicle are closed by suitable aprons, such as the apron 49 of Fig. 11. The apron structure is preferably such that any such open spaces will be closed thereby and that separate removable portions thereof will provide access to the cab where required. These respective removable aprons may be suspended from the removable bars 13 and 10 in the manner illustrated in Fig. 11, so as to be removable with such detachable bars when not in use.

Although but one specific embodiment of this invention is herein shown and described, it will be understood that numerous details of the structure shown may be altered or omitted without departing from the spirit of the invention as defined by the following claims.

I claim:

1. A vehicle cab structure, comprising a pair of laterally spaced vertically disposed longitudinal girder frames, vertically spaced top and bottom horizontal frames attached to said girder frames, the side members of said top and bottom frames being bowed laterally outward from said girder frames to define bays at opposite sides of the cab structure, vertically disposed bars connecting said top and bottom frames to define side wall panel areas in said bays, and closure means mounted on said frames.

2. A vehicle cab structure, comprising a pair of laterally spaced vertically disposed longitudinal girder frames, vertically spaced top and bottom horizontal frames attached to said girder frames, the side members of said top and bottom frames being bowed laterally outward from said girder frames to define bays at opposite sides of the cab structure, vertically disposed bars connecting said top and bottom frames to define side wall panel areas in said bays, and closure means mounted on said frames, said closure means including a wall panel frame hinged to swing on a horizontal axis adjacent its upper edge.

3. A vehicle cab structure, comprising a pair of laterally spaced vertically disposed longitudinal girder frames, vertically spaced top and bottom horizontal frames attached to said girder frames, the side members of said top and bottom frames being bowed laterally outward from said girder frames to define bays at opposite sides of the cab structure, vertically disposed bars connecting said top and bottom frames to define side wall panel areas in said bays, closure means mounted on said frames, said closure means including a wall panel frame hinged to swing on a horizontal axis adjacent its upper edge, and a link hinged to said wall panel frame for engagement with a stationary portion of one of said frames to support said wall panel frame in an open position.

4. A vehicle cab structure, comprising a pair of laterally spaced vertically disposed longitudinal girder frames, vertically spaced top and bottom horizontal frames attached to said girder frames, the side members of said top and bottom frames being bowed laterally outward from said girder frames to define bays at opposite sides of the cab structure, vertically disposed bars connecting said top and bottom frames to define side wall panel areas in said bays, and closure means mounted on said frames, said closure means including a wall panel frame hinged to swing on a horizontal axis adjacent its upper edge, and said bottom horizontal frame having a removable bar portion below said side wall panel frame.

5. A vehicle cab structure, comprising a pair of laterally spaced vertically disposed longitudinal girder frames, vertically spaced top and bottom horizontal frames attached to said girder frames, the side members of said top and bottom frames being bowed laterally outward from said girder frames to define bays at opposite sides of the cab structure, vertically disposed bars connecting said top and bottom frames to define side wall panel areas in said bays, and closure means mounted on said frames, said closure means including a wall panel frame hinged to swing on a horizontal axis adjacent its upper edge, said bottom horizontal frame having a removable bar portion below said side wall panel frame, and a flexible apron hung on said removable bar portion.

LA VERN A. CAMPBELL.

REFERENCES CITED

The following references are of record in the file of this patent:

UNITED STATES PATENTS

| Number | Name | Date |
| --- | --- | --- |
| 1,422,498 | Vint | July 11, 1922 |
| 1,461,574 | Caplan | July 10, 1923 |
| 2,430,442 | Acheson | Nov. 11, 1947 |